Patented Apr. 25, 1939

2,155,459

UNITED STATES PATENT OFFICE 2,155,459

POLYMETHINE DYESTUFFS AND A PROCESS OF MAKING SAME

Carl Winter and Nikolaus Roh, Ludwigshafen-on-the-Rhine, and Paul Wolff and Gustav Schaefer, Frankfort-on-the-Main-Hochst, Germany, assignors to General Aniline Works, Inc., New York, N. Y., a corporation of Delaware No Drawing. Application July 31, 1936, Serial No. 93,572. In Germany August 16, 1935

12 Claims. (Cl. 260—240)

The present invention relates to polymethine dyestuffs and a process of making same.

We have found that valuable polymethine dyestuffs are obtained by causing aldehydes of heterocyclic nitrogen compounds which contain a reactive methylene group in alpha-position to nitrogen and in which the aldehyde group stands instead of a hydrogen atom of the methylene group (hereinafter referred to as 2-methylene-indoline-omega-aldehydes) to react with primary or secondary purely aromatic amines in the presence of acid condensing agents.

As primary aromatic amines, both monoamines and polyamines and their derivatives may be employed it being advantageous to employ one molecular proportion of 2-methylene-indoline-omega-aldehyde for one amino group. The new dyestuffs resemble the basic triphenylmethane dyestuffs of the auramine series and have the following general structure

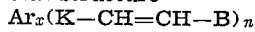

wherein Ar stands for an aromatic radicle, B stands for the radicle of a 1.3.3-trimethyl-indoline which is attached to the methine group in alpha-position to the heterocyclic nitrogen atom, $x$ stands for a member selected from the group consisting of 1 and 2, K stands for a member selected from the group consisting of —NH and =N and $n$ stands for a member selected from the group consisting of 1, 2 and 3, K being =N when $x$ is 2 and $x$ being 1 and K being —NH when $n$ is more than 1. They are generally speaking readily soluble in water and are distinguished in part by excellent clarity and very good fastness to light of the dyeings. They may be converted into valuable acid dyestuffs by sulphonation. A great deal of the dyestuffs are suitable for the preparation of lakes which are distinguished by their good fastness to light.

The following examples will further illustrate how this invention may be carried out in practice but the invention is not restricted to these examples. The parts are by weight unless otherwise stated.

Example 1

10.5 parts of 1.3.3-trimethyl-2-methylene-indoline-omega-aldehyde are added to a solution of 7 parts of aniline hydrochloride in 100 parts of water and the mixture is heated for about half an hour at about 100° C. The aldehyde thus passes into solution and the mixture becomes colored strongly yellow. After cooling, the dyestuff crystallises in pure yellow crystals. They are filtered off by suction, washed with a little water and dried. The yield is about 16.1 parts. The dyestuff dyes cotton mordanted with tannic acid clear golden yellow shades.

Example 2

20 parts by volume of 30 per cent hydrochloric acid are diluted to 100 parts with water, 6 parts of para-phenylenediamine and 21 parts of 1.3.3-trimethyl-2-methylene-indoline-omega-aldehyde are added and the mixture heated for half an hour at about 100° C. The dyestuff which crystallises out after cooling is filtered off by suction, washed with a little water and dried under reduced pressure. It dyes cotton mordanted with tannic acid very clear orange shades. The yield is about 29 parts. If 10 parts of benzidine be employed instead of para-phenylenediamine, a dyestuff is obtained which dyes cotton mordanted with tannic acid reddish yellow shades.

Example 3

A mixture of 100 parts of 20 per cent sulphuric acid, 10.5 parts of 1.3.3-trimethyl-2-methylene-indoline-omega-aldehyde and 8.5 parts of diphenylamine is heated for an hour at about 100° C. The resulting strongly yellow colored solution is introduced into about 200 parts of water and the dyestuff is precipitated with about 60 parts of sodium chloride. After separating the acid liquid, the dyestuff is introduced into water and the solution is extracted with benzene for the removal of unchanged starting materials. The readily soluble dyestuff is then precipitated from the solution as the zinc chloride double salt by the addition of zinc chloride and sodium chloride. It dyes cotton mordanted with tannic acid greenish yellow shades.

Example 4

A mixture of 100 parts of 50 per cent sulphuric acid, 10.5 parts of 1.3.3-trimethyl-2-methylene-indoline-omega-aldehyde and 14 parts of N-(para-ethoxyphenyl)-1-aminonaphthalene is heated for 1½ hours at about 100° C. while stirring. The mixture is then introduced into 1000 parts of water and the dyestuff is precipitated with 200 parts of sodium chloride. After separating the acid liquid, the dyestuff is dissolved in water, the solution freed from resinous constituents by extraction with benzene and the dyestuff again precipitated with common salt. After crystallisation from a little water, the dyestuff is obtained pure in the form of yellow crystals. It dyes cotton mordanted with tannic acid golden yellow shades.

Example 5

16 parts of phosphorus oxychloride are allowed to flow slowly at 20° C. while stirring into a solution of 20 parts of 4.4'-dimethyldiphenylamine and 21 parts of 1.3.3-trimethyl-2-methylene-indoline-omega-aldehyde in 150 parts of benzene. The temperature thus rises to about 50° C. After stirring for about 2½ hours, the mass is introduced into 200 parts of water, the benzene is removed by means of steam and the dyestuff is isolated from the filtered solution in the form of yellow crystals by precipitation with common salt. It dyes cotton mordanted with tannic acid clear yellow shades.

The following list gives a series of new dyestuffs obtainable according to this invention:

| Aldehyde | Base | Shade of dyeing on cotton mordanted with tannic acid |
|---|---|---|
| 1 molecular proportion of— | 1 molecular proportion of— | |
| 1.3.3-trimethyl-2-methylene-indoline-omega-aldehyde | Para-phenetidine | Golden yellow. |
| Do | Para-nitraniline | Reddish yellow. |
| Do | 1-aminonaphthalene | Golden yellow. |
| Do | 4-aminoazobenzene | Red-yellow. |
| Do | Para-anisidine | Green-yellow. |
| Do | Para-toluidine | Do. |
| 2 molecular proportions of— | | |
| 1.3.3-trimethyl-2-methylene-indoline-omega-aldehyde | Ortho-phenylene-diamine | Reddish yellow. |
| Do | Meta-phenylene-diamine | Golden yellow. |
| Do | 2.4-toluylene-diamine | Do. |
| Do | 1.5-naphthylene-diamine | Red-yellow. |
| Do | 3.3'.4.4'-tolidine | Do. |
| Do | 3.3'-diaminoazo-benzene | Greenish yellow. |
| Do | 4.4'-diaminoazo-benzene | Red. |
| Do | 4.4'-diaminodiphenyl-methane | Green-yellow. |
| Do | 4.4'-diaminobenzo-phenone | Golden yellow. |
| Do | 4.4'-diaminodiphenyl-amine | Brown-red. |
| Do | 5.5'-diamino-2.2'-methylene-diphenyl-sulphone | Red-yellow. |
| Do | 4.4'-diamino-3.3'-dimethoxydiphenylmethane | Golden yellow. |
| Do | 4.4'-diamino-3.3'-dichlordiphenylmethane | Green-yellow. |
| Do | 4.4'-diaminodiphenyl ether | Golden yellow. |
| Do | 4.4'-diaminodiphenyl-urea | Red-yellow. |
| 1.3.3-trimethyl-2-methylene-indoline-omega-aldehyde | 4.4'-diamino-3.3'-dimethyldiphenylmethane | Green-yellow. |
| 3 molecular proportions of— | | |
| 1.3.3-trimethyl-2-methylene-indoline-omega-aldehyde | Para-leucaniline | Golden yellow. |
| 1 molecular proportion of— | | |
| 1.3.3-trimethyl-2-methylene-indoline-omega-aldehyde | 4-ethoxydiphenylamine | Do. |
| Do | 3.4'-diethoxydiphenylamine | Reddish yellow. |
| Do | 4.4'-diethoxydiphenylamine | Golden yellow. |
| 5-methoxy-1.3.3-trimethyl-2-methylene-indoline-omega-aldehyde | Diphenylamine | Do. |
| Do | Para-ethoxy-diphenylamine | Do. |
| Do | 3.4'-diethoxy-diphenylamine | Red-yellow. |
| Do | N-(para-ethoxyphenyl)-1-amino-naphthalene | Do. |
| 2 molecular proportions of— | | |
| 5-methoxy-1.3.3-trimethyl-2-methylene-indoline-omega-aldehyde | Para-phenylene-diamine | Orange. | the dyestuff resulting from the reaction of said aldehyde and said diethoxydiphenylamine has the following structure

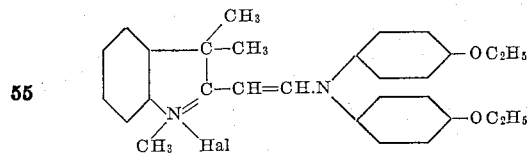

What we claim is:

1. Dyestuffs of the polymethine series corresponding to the general formula

B—CH=CH—NH—Ar—NH—CH=CH—B wherein Ar stands for an aromatic radicle, and wherein B stands for the radicle of a 1.3.3-trimethyl indoline which is attached to the methine group in alpha-position to the heterocyclic nitrogen atom.

2. Dyestuffs of the polymethine series corresponding to the general formula

B—CH=CH—NH—Ar—NH—CH=CH—B wherein Ar stands for a radicle of the benzene series and wherein B stands for the radicle of a 1.3.3-trimethyl indoline which is attached to the methine group in alpha-position to the heterocyclic nitrogen atom.

3. Dyestuffs of the polymethine series corresponding to the general formula

B—CH=CH—NH—Ar—NH—CH=CH—B wherein Ar stands for an aromatic radicle containing two phenyl nuclei and wherein B stands for the radicle of a 1.3.3-trimethyl indoline which is attached to the methine group in alpha-position to the heterocyclic nitrogen atom.

4. Dyestuffs of the polymethine series corresponding to the general formula

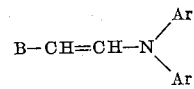

wherein the Ar's stand for aromatic radicles and wherein B stands for the radicle of a 1.3.3-trimethyl indoline which is attached to the methine group in alpha-position to the heterocyclic nitrogen atom.

5. Dyestuffs of the polymethine series corresponding to the general formula

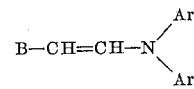

wherein the Ar's stand for radicles of the benzene series and wherein B stands for the radicle of a 1.3.3-trimethyl indoline which is attached to the methine group in alpha-position to the heterocyclic nitrogen atom.

6. The dyestuff of the polymethine series corresponding to the formula

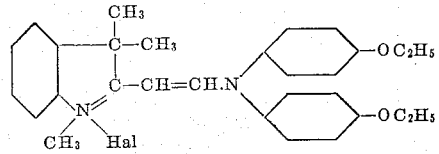

wherein Hal stands for halogen.

7. The process of producing dyestuffs of the polymethine series which consists in causing a 1.3.3-trimethyl-indoline-2-methylene-ω-aldehyde to react in the presence of an acid condensing agent with an amine selected from the group consisting of the primary and secondary purely aromatic amines, said amine containing from 1 to 3 amino groups selected from the group consisting of primary and secondary amino groups, at least one molecular proportion of aldehyde being employed for each molecular proportion of said amine.

8. The process of producing dyestuffs of the polymethine series which consists in causing about one molecular proportion of a 1.3.3-trimethyl-indoline-2-methylene-ω-aldehyde to react in the presence of an acid condensing agent with about one molecular proportion of a 1.3.3-trimethyl-indoline - 2 - methylene-ω-aldehyde to react in the presence of an acid condensing agent with about one molecular proportion of a monoamine selected from the group consisting of the primary and secondary purely aromatic monoamines.

9. The process of producing dyestuffs of the polymethine series which consists in causing about two molecular proportions of a 1.3.3-trimethyl-indoline-2-methylene-ω-aldehyde to react in the presence of an acid condensing agent with about one molecular proportion of a purely aromatic primary diamine.

10. The process of producing dyestuffs of the polymethine series which consists in causing about one molecular proportion of a 1.3.3-trimethyl-indoline-2-methylene-ω-aldehyde to react in the presence of an acid condensing agent with about one molecular proportion of a purely aromatic primary mono-amine.

11. The process of producing dyestuffs of the polymethine series which consists in causing about one molecular proportion of a 1.3.3-trimethyl-indoline-2-methylene-ω-aldehyde to react in the presence of an acid condensing agent with about one molecular proportion of a purely aromatic primary mono-amine of the benzene series.

12. Dyestuffs of the polymethine series corresponding to the general formula:

$$Ar_x(K-CH=CH-B)_n$$

wherein Ar stands for an aromatic radicle, B stands for the radicle of a 1.3.3-trimethyl-indoline which is attached to the methine group in alpha-position to the heterocyclic nitrogen atom, $x$ stands for a member selected from the group consisting of 1 and 2, K stands for a member selected from the group consisting of —NH and =N and $n$ stands for a member selected from the group consisting of 1, 2 and 3, K being =N when $x$ is 2 and $x$ being 1 and K being —NH when $n$ is more than 1.

CARL WINTER.
NIKOLAUS ROH.
PAUL WOLFF.
GUSTAV SCHAEFER.